United States Patent
Komara (10) Patent No.: US 6,370,384 B1
(45) Date of Patent: Apr. 9, 2002

(54) FREQUENCY RE-USE PLANNING FOR WIRELESS COMMUNICATIONS SYSTEM USING WIRELESS TRANSLATING REPEATERS

(75) Inventor: Michael A. Komara, Indialantic, FL (US)

(73) Assignee: Airnet Communications Corporation, Melbourne, FL (US)

( * ) Notice: Subject to any disclaimer, the term of this patent is extended or adjusted under 35 U.S.C. 154(b) by 0 days.

(21) Appl. No.: 09/362,867

(22) Filed: Jul. 29, 1999

Related U.S. Application Data (60) Provisional application No. 60/094,661, filed on Jul. 30, 1998.

(51) Int. Cl.[7] ............................. H04Q 7/20; H04B 7/14
(52) U.S. Cl. .................. 455/447; 455/450; 455/20; 455/15
(58) Field of Search ................. 455/446, 447, 455/450, 561, 562, 15, 17, 20, 25, 11.1, 16, 454, 455

(56) References Cited

U.S. PATENT DOCUMENTS

| | | | | |
|---|---|---|---|---|
| 4,759,051 A | * | 7/1988 | Han | 455/25 |
| 5,408,679 A | * | 4/1995 | Masuda | 455/11.1 |
| 5,479,400 A | * | 12/1995 | Dilworth et al. | 455/524 |
| 5,509,028 A | * | 4/1996 | Marque-Pucheu | 455/7 |
| 5,953,637 A | * | 9/1999 | Coons et al. | 455/11.1 |
| 5,960,351 A | * | 9/1999 | Przelomiec | 455/450 |
| 5,970,406 A | * | 10/1999 | Komara | 455/422 |
| 5,970,410 A | * | 10/1999 | Carney et al. | 455/447 |
| 5,974,323 A | * | 10/1999 | Doner | 455/447 |
| 6,088,592 A | * | 7/2000 | Doner et al. | 455/447 |
| 6,188,903 B1 | * | 2/2001 | Gardner et al. | 455/447 |

* cited by examiner

Primary Examiner—William Trost
Assistant Examiner—Rafael Perez-Gutierrez
(74) Attorney, Agent, or Firm—Akerman Senterfitt (57) ABSTRACT

A novel improved frequency re-use planning which allows the most efficient bandwidth utilization and a larger coverage area in a wireless communications network utilizing translating repeaters is described. The wireless communications network has an available radio frequency bandwidth divided into a number of radio frequency communication channels. The channel assignments according to the frequency re-use plan described by this invention makes possible to achieve larger service coverage area using one or more base transceiver system, and efficient utilization of the limited bandwidth allocated to the network. According to the inventive frequency re-use planning, two adjacently located frequency channels are utilized while still meeting the signal isolation requirement between the adjacent channels by assigning the adjacent channels to cells that are remotely located from each other.

19 Claims, 9 Drawing Sheets

FREQUENCY RE-USE PLANNING FOR WIRELESS COMMUNICATIONS SYSTEM USING WIRELESS TRANSLATING REPEATERS

This application is related to and claims priority from U.S. Provisional Application No. 60/094,661 entitled "IMPROVED FREQUENCY RE-USE PLANNING FOR WIRELESS COMMUNICATIONS SYSTEM USING WIRELESS TRANSLATING REPEATERS," filed Jul. 30, 1998, the entirety of which is incorporated herein by reference.

BACKGROUND OF THE INVENTION

1. Field of the Invention

This invention relates generally to a method of and apparatus for operation of a wireless communications system, and more specifically to methods of and apparatuses for increasing communication capacity through frequency re-use planning particularly for wireless communications systems using wireless translating repeaters.

2. Background of the Invention

Figure 8:
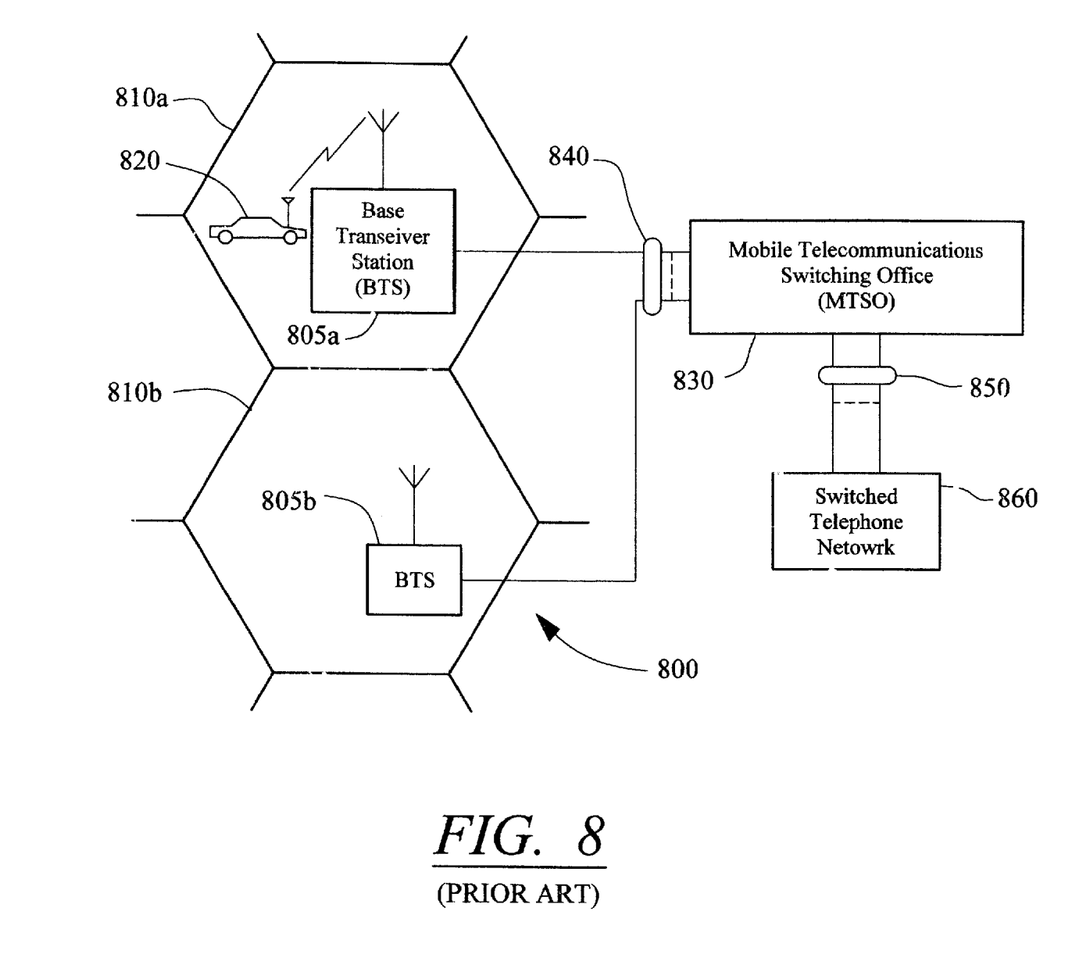
FIG. 8 illustrates a conventional wireless communications network.

A conventional wireless communications network 800 is shown in FIG. 8. As illustrated in FIG. 8, the wireless communications network 800 includes a plurality of cells 810a, 810b, a mobile unit 820, a plurality of base station transceivers (BTS) 805a, 805b, communication lines 840, a mobile telecommunications switching office (MTSO) 830, an interface 850, and a public switched telephone network (PSTN) 860.

The wireless communications network 800 has a fixed number of channel sets distributed among the BTS 805a, 805b serving a plurality of cells 810a, 810b arranged in a predetermined pattern. The mobile unit 820, in a cell 810a or 810b, communicates with the BTS 805a or 805b, respectively, via radio frequency (RF) means. The BTS 805a, 805b communicate with the MTSO 830 via communication lines 840. The MTSO 830 communicates with the switched telephone network 860 via the interface 850.

In the conventional wireless communications network 800, the cell areas typically range from 1 to 300 square miles. The larger cells typically cover rural areas, and the smaller cells typically cover urban areas. Cell antenna sites utilizing the same channel sets are spaced by a sufficient distance, e.g., typically referred to as the "reuse distance", to assure that co-channel interference is held to an acceptably low level.

The mobile unit 820 in a cell 810a has radio telephone transceiver equipment which communicates with similar equipment in BTS 805a, 805b as the mobile unit 820 moves from cell to cell.

Each BTS 805a, 805b relays telephone signals between mobile units 820 and a mobile telecommunications switching office (MTSO) 830 by way of the communication lines 840.

The communication lines 840 between a cell site, 810a or 810b, and the MTSO 830, are typically T1 lines. The T1 lines carry separate voice grade circuits for each radio channel equipped at the cell site, and data circuits for switching and other control functions.

The MTSO 830 in FIG. 8 includes a switching network (not shown) for establishing call connections between the public switched telephone network (PTSN) 860 and mobile units 820 located in cell sites 810a, 810b and for switching call connections from one cell site to another. In addition, the MTSO 830 includes a dual access feeder (not shown) for use in switching a call connection from one cell site to another. Various handoff criteria are known in the art and utilize features such as delay ranging to indicate the distance of a mobile unit from a receiving cell site, triangulation, and received signal strength to indicate the potential desirability of a handoff. Also included in the MTSO 830 is a central processing unit (not shown) for processing data received from the cell sites and supervisory signals obtained from the switched telephone network 860 to control the operation of setting up and taking down call connections.

The BTS 805a or 805b provides coverage for multiple subscribers in a specific cell, e.g., 810a or 810b. As the mobile unit 820 enters a cell, the BTS 805a or 805b and the mobile unit 820 communicate with one another. Information from this initial exchange is used by the cellular communication system 800 so that it can route calls to and from the mobile unit 820.

The BTS 805a or 805b has a limited coverage area. As a result, one technique for providing coverage for a large geographic area is to install multiple BTS units. Multiple BTS units are installed to provide coverage for a large geographic area. This strategy also provides the benefit of increasing capacity, so that the cellular system 800 can serve a larger number of subscribers within its coverage area. However, a major drawback to this solution is the high cost of a BTS. As an alternative, a repeater is often used to improve coverage area, reduce cost, and to improve clarity.

Generally, repeaters receive a downlink signal from a BTS and retransmit the downlink signal to a mobile unit after the downlink signal has been amplified by a downlink amplifier. The process works similarly in reverse, where the repeater will amplify an uplink signal from a mobile unit to the BTS with an uplink amplifier. The amplifiers provide an increase in signal strength which improves the clarity of the calls and prevents dropped calls. To distinguish the direction of the signals transmitted and received by the repeaters, the path between the repeater and the BTS is referred to as the "backhaul" signal path.

Unfortunately, while the wireless repeaters thus far described provide a relatively large RF coverage area at a relatively low cost and without the need for a wireline backhaul, the operators of the prior art wireless communications networks must pay a penalty in available communication frequency as conventional wireless communications networks would have less number of available communications channels as a result of the addition of the repeaters.

Operators of wireless communications network must provide communications services to increasing number of subscribers using a limited available RF bandwidth. For example, each of operators of wireless systems, e.g., one based on the GSM-1900 standard, may be licensed to use only a total bandwidth of, e.g., 5 MHz to provide communications services to its subscriber.

Each communication channel of conventional wireless communications network, utilizing, e.g., the Gaussian Minimum Shift Keying (GMSK) modulated waveforms in, e.g., GSM-1900, GSM-1800 and GSM-900 standards, occupies 200 KHz of bandwidth. Moreover, because, e.g., according to the GSM standards, signal level from an adjacent channel must at least 9 dB below the desired signal level of a channel, in a conventional wireless communications network, center frequencies of any two adjacent channels must be at least 400 kHz apart from each another.

Thus, in a conventional wireless communication network having a 5 MHz of available RF bandwidth may be afforded at most 12 RF carrier channels (e.g., 5 MHz/400 kHz). The number of available carrier channels is further reduced when repeaters are employed in the network because communication via a repeater requires two rather than one channel to accommodate both the "local" communications, e.g., between the repeaters and the mobile units, and the "backhaul" communications, e.g., between the BTS and the repeaters.

Figure 9:
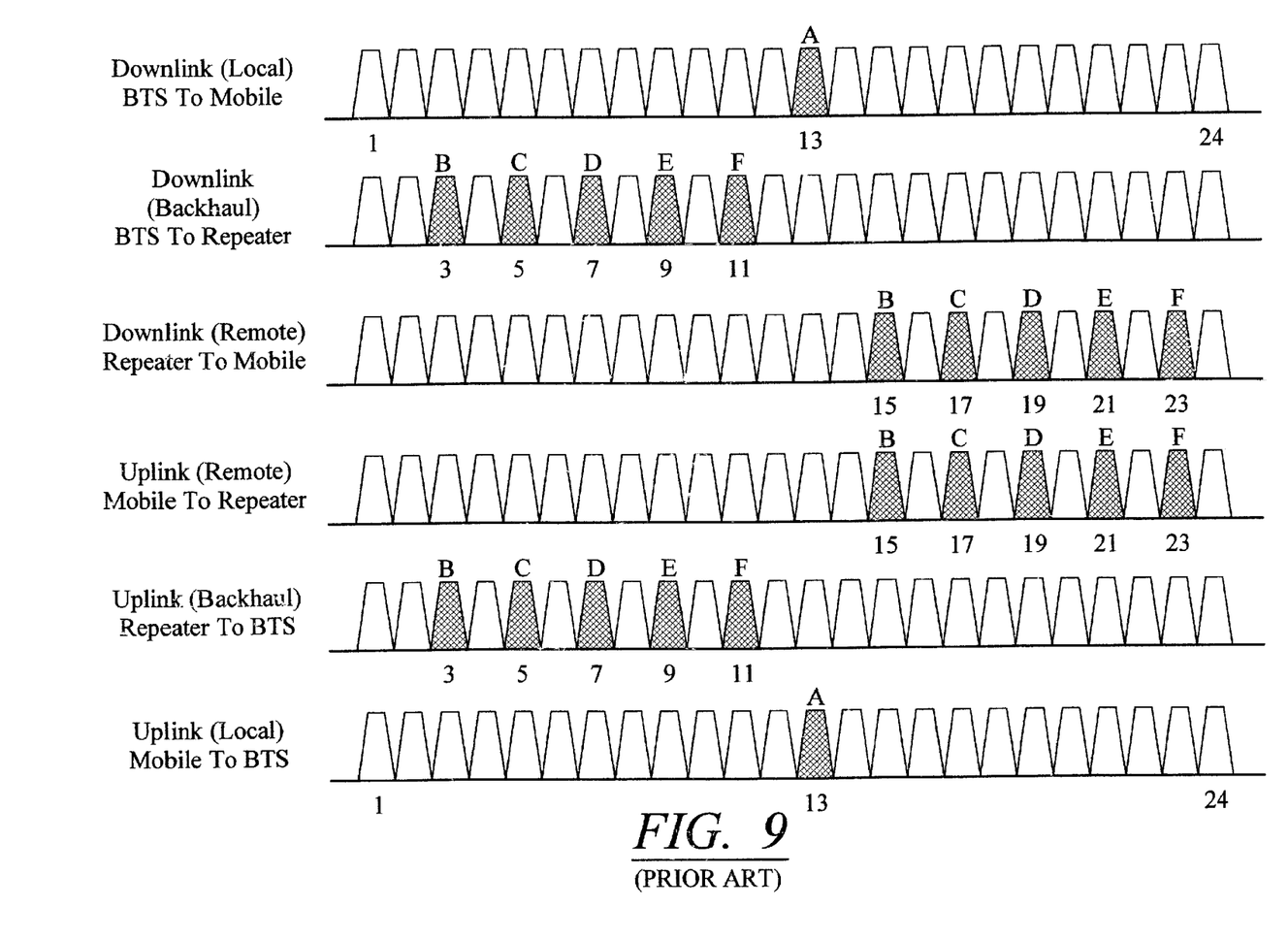
FIG. 9 illustrates a frequency assignment for a wireless communications network having translating repeaters utilizing conventional frequency planning.

For example, as shown in FIG. 9, a wireless communications network having one local cell A, and 5 repeaters B, C, D, E, and F, may utilize every other available frequency carrier channels, and thus would only be afforded 6 carrier channels 1, 3, 5, 7, 9, 11, and 13 (e.g., half of a network without repeaters), and thus may only have a total of 6 cells that may be served by a BTS.

Furthermore, if an operator of a conventional wireless communications network desires to have more available channels, then the operator must reduce the number of repeaters, thus also reducing the coverage area. Thus, in a conventional wireless communications network, a trade-off between efficient utilization of available RF bandwidth and larger coverage area usage must be made.

Accordingly, there is a need in the art for frequency planning that allows the maximum usage of the available RF bandwidth of a wireless communications network while at the same time affording an operator of the network the benefit of employing repeaters for larger coverage area.

SUMMARY OF THE INVENTION

An object of the present invention is to provide the maximum efficiency in RF bandwidth utilization in a wireless communications network.

Another object of the present invention is to increase the number of available RF communication channels without reducing the coverage area of a BTS in a wireless communications network.

Another object of the present invention is to provide a method for maximizing coverage area of a BTS in a wireless communications network.

It is yet another object of the present invention to provide a cost-effective means for increasing coverage area without reducing the number of available RF communication channels in a wireless communications network having a limited total RF bandwidth.

According to the principles of the present invention, a wireless communications network having an available radio frequency bandwidth divided into a plurality of radio frequency communication channels comprises a base transceiver system in communication with at least one subscriber in a coverage area arranged in a plurality of geographic cells, and at least one repeater having at least one ground wireless communication channel and at least one backhaul wireless communication channel, said at least one ground communication channel being operative to provide communication between said at least one repeater and said at least one subscriber, said at least one backhaul communication channel enabling communication between said base transceiver system and said at least one repeater, wherein at least two of said plurality of radio frequency communication channels adjacent to each other in a frequency spectrum are utilized by said wireless communications network for communications between at least two of said base transceiver system, said at least one repeater and said at least one subscriber.

According to the principles of the present invention, a method of assigning a plurality of communication channels of an available radio frequency bandwidth in a wireless communications network comprises assigning at least a first one of said plurality of communication channels for communication between a repeater and a subscriber of said wireless communications network, assigning at least a second one of said plurality of communication channels for communication between said repeater and a base transceiver system, said at least first one of said plurality of communication channels being adjacent in a frequency spectrum to said second one of said plurality of communication channels.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

The present invention achieves the aforementioned desired objects by providing a novel improved frequency re-use plan which allows the most efficient bandwidth utilization and a larger coverage area made possible by the use of inexpensive repeaters.

Figure 1:
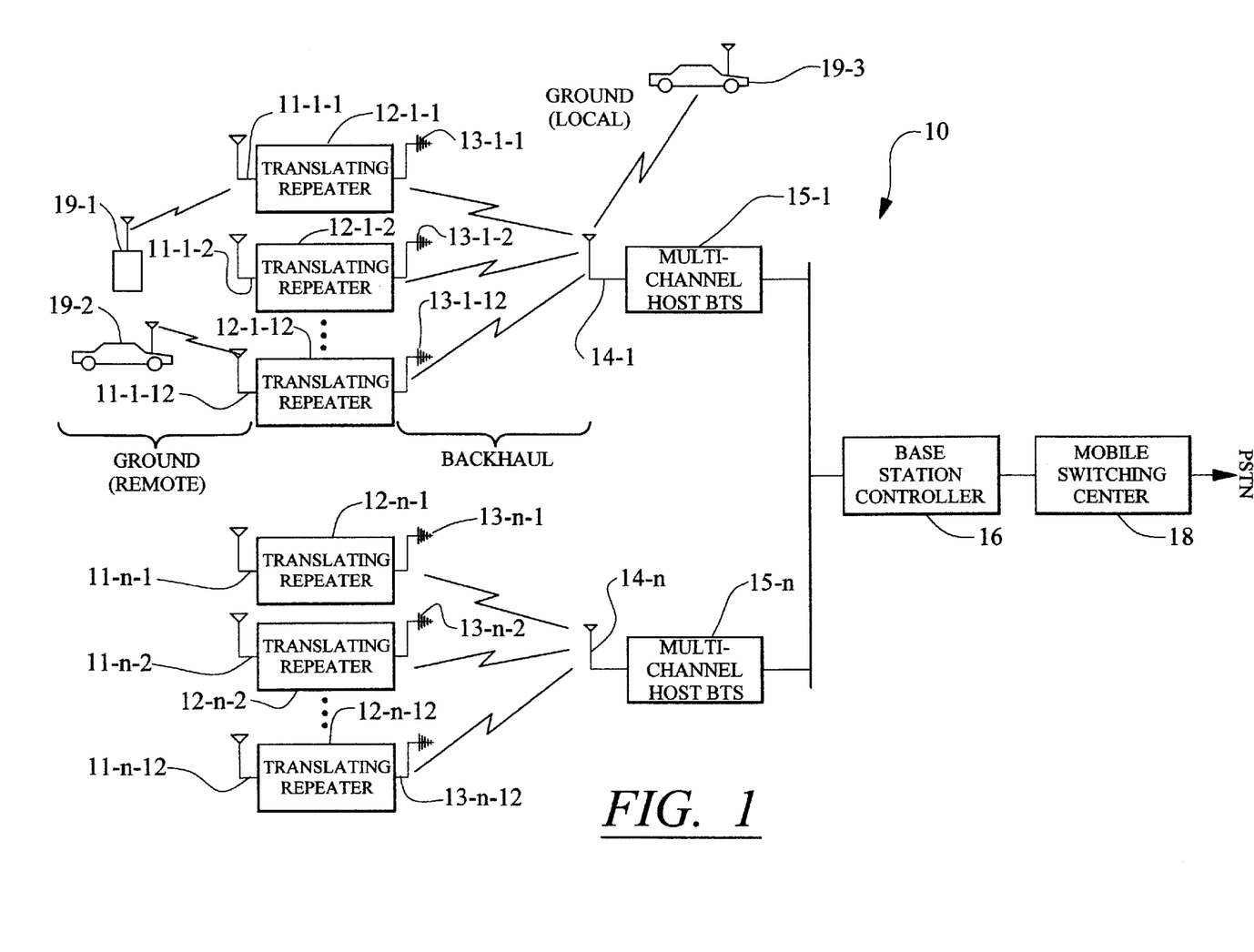
FIG. 1 illustrates a block diagram of relevant parts of a wireless communications network in which the methods and apparatuses in accordance with the principles of the present invention may be utilized.

In order for an easier understanding of the advantageous frequency re-use planning in accordance with the principle of the present invention, an exemplar wireless communication network in which the inventive principles may be applied is now described referring to FIG. 1. However, it will be apparent to one of ordinary skill in the art that the particular exemplary wireless network which will be described is but one of many possible wireless communications network.

FIG. 1 illustrates relevant portions of a wireless communication system 10, e.g., a Cellular Mobile Telephone (CMT), Personal Communication System (PCS), or similar communications systems in which a wireless communication service is provided to a subscriber of the network.

In particular, the wireless communication system 10 provides voice and/or data communication between mobile stations 19 (MS) and a Public Switched Telephone Network (PSTN) via radio frequency (RF) signals. In the particular embodiment of the invention being described, the radio signaling protocol, or "air interfaces," may use a Time Division Multiple Access (TDMA) technique such as the GSM-1900 standard promulgated by the Telecommunications Industry Association (TIA) in the United States [which is identical in relevant aspects to the Global System for Mobile Communication (GSM) standard promulgated in Europe and elsewhere by the Europeon Telecommunication Standards Institute (ETSI)].

The repeaters 12-1, 12-2, . . . , 12-n (collectively, the translating repeaters 12, and also referred to herein as the "translating extenders") are each located in what is normally to be approximately the center of a geographical area called a "cell" site among a group or cluster of cells. The repeaters 12 receive uplink radio frequency signals from the mobile stations 19-1 and 19-2 located in their respective cells and forward these signals to the associated host Base Transceiver System (BTS) 15. Likewise, downlink radio frequency signals originating at the host BTS 15 are forwarded by the translating repeaters 12 to the mobile stations 19. The host BTS 15 may send and receive radio frequency signals to and from a mobile station 19-3 located within its local cell.

The communications between the BTS 15 and the repeaters 12 are hereinafter referred to as the "backhaul" communication. The communications between the repeaters 12 and the mobile stations 19 and the communications between the BTS 15 and the mobile station 19-3 located within the local cell of the BTS 15 are hereinafter referred to as the "Ground" communications. The communications between the repeaters and mobile stations 19-1 and 19-2 that are in a cell remote to the BTS 15 is further referred to as remote ground communication while the communications between the BTS 15 and the mobile station 19-3 local to the BTS 15 is referred to as the local ground communication.

The wireless communication network 10 includes translating repeater omni-directional antennas 11-1, . . . , 11-n-2, 11-n-1, 11-n (collectively, the omni-directional antennas 11), translating repeater directional antennas 13-1, . . . , 13-n, host base station antennas 14-1, . . . , 14-n, multichannel host Base Transceiver Systems (BTSs) 15-1, . . . , 15-n, one or more base station controllers 16, a mobile switching center 18, and mobile stations 19-1, . . . , 19-2.

The host BTSs 15-1, . . . , 15-n are responsible for demodulating radio frequency signals as well as for connecting such signals to the Public Switched Telephone Network (PSTN) through the mobile switching center 18. The host BTSs 15-1, . . . , 15-n also modulate signals received from the PSTN through the mobile switching center 18 to format them for transmission over the air through the translating repeaters 12. A particular host BTS 15-1 serves the multiple translating repeaters 12-1-1, 12-1-2, . . . , 12-1-n associated with a given cluster of cells that define its coverage area.

The Base Station Controller (BSC) 16, of which there may be more than one, has a number of functions. The primary function is to manage the logical connections made between mobile stations 19 and the PSTN. In order to do so, the Base Station Controller 16 assigns transmit and receive radio carrier frequencies to each individual mobile station 19, translating repeaters 12, and host BTS 15. Typically, there may be five to twenty BTSs 15-1, . . . , 15-n serviced by a single Base Station Controller 16.

The translating repeaters 12 may be thought of as "base stations" in the sense that they are each associated with a particular cell and in that they each receive and transmit multiple signals from and to the mobile stations 19-1 and 19-2. However, the translating repeaters 12 of this exemplary embodiment may not perform demodulation and modulation functions as do conventional base stations. Rather, they serve only to perform an in-band frequency-translation on signals received from the mobile stations 19 and then direct such signals on a different frequency to the host BTS 15. The translating repeaters 12 also perform the inverse function, to frequency translate signals received from the host BTS 15 and then direct them to the mobile stations 19.

More detailed descriptions of the host BTS 15, the translating repeaters 12 and the wireless communications network 10, and their operations may be found in a U.S. patent application Ser. No. 08/772,181, assigned to the assignee of this application, entitled "TIME SLOT RECOVERY FOR REMOTE IN-BAND TRANSLATOR IN TIME DIVISION MULTIPLE ACCESS WIRELESS SYSTEM" filed Dec. 20, 1996, the entirety of which is incorporated by reference herein. It should be understood that, while a particular exemplary BTS and repeater are described in this example, any other suitable BTS and repeaters may be employed in a wireless network utilizing the inventive frequency re-use planning in accordance with the principles of the present invention.

The operator of the communications network 10 may be allocated a limited bandwidth, e.g., 5 MHz downlink in the 1930–1990 MHz range, and 5 MHz uplink in the 1850–1910 MHz range as is the case with the GSM-1900 standard. Each of the communication channels occupy a predetermined portion, e.g., 200 kHz as is the case for systems using, e.g., GSM-1900, GSM-1800, and GSM-900. Thus, there are twenty five (25) available channels, each occupying 200 kHz of bandwidth (i.e., 5 MHz/200 kHz=25).

Figure 7:
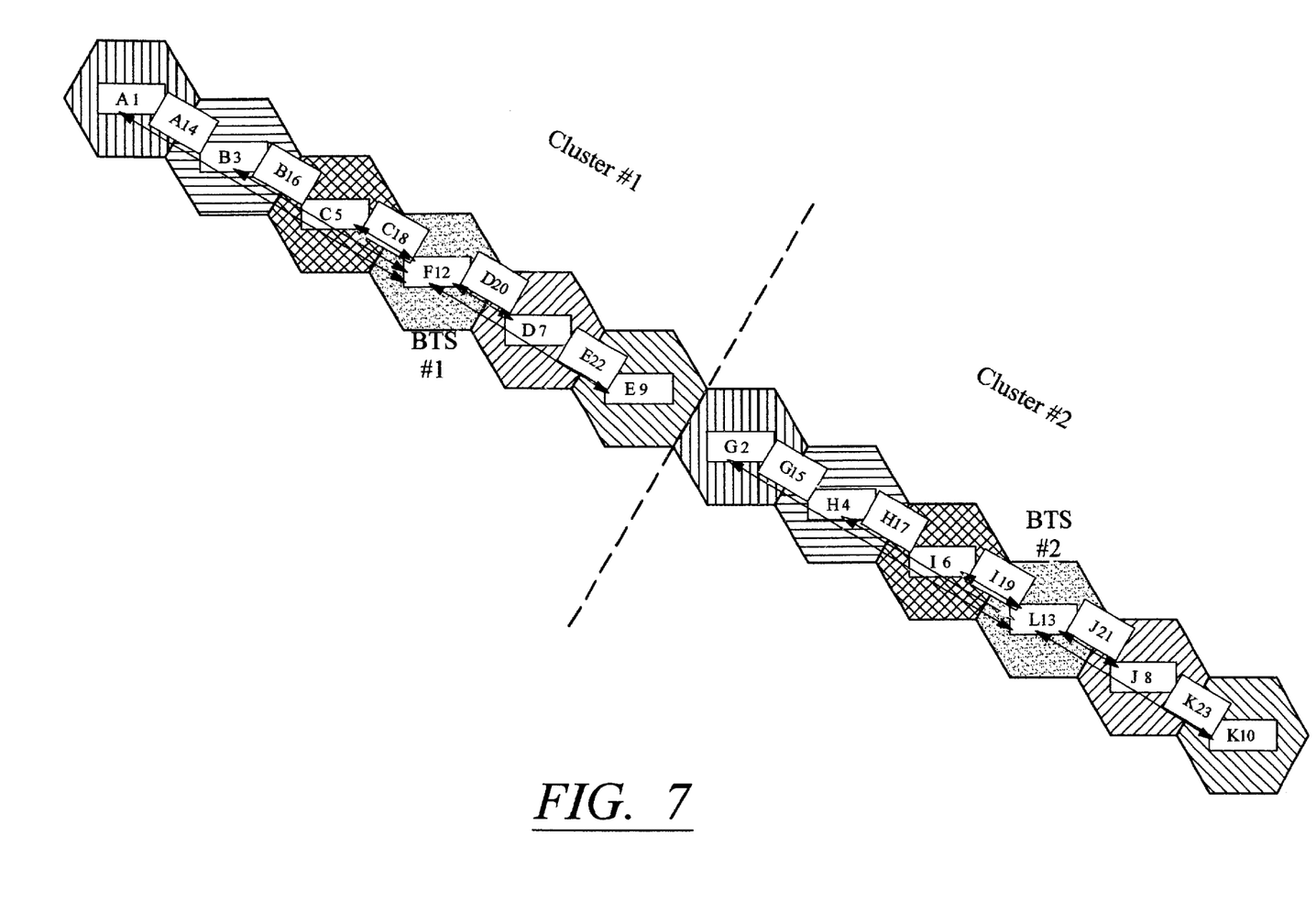
FIG. 7 illustrates a physical cell layout associated with the exemplary frequency assignment for the two base transceiver systems embodiment shown in FIG. 6.

The conventional frequency planning as shown in FIG. 7 that makes use of only eleven (11) non-adjacent channels in the frequency spectrum among the available twenty five (25) channels to provide only six (6) RF carrier communication channels, thus allowing a maximum of six (6) channels to be served by a single BTS 15. In contrast, the frequency re-use planning according to the principles of the present invention makes use of up to twenty four (24) of the available twenty five (25) channels to provide twelve (12) RF carrier communication channels (e.g., thus up to twelve (12) cells serviced by a single BTS 15) by utilizing adjacent channels in the frequency spectrum.

The required interference signal level from the adjacent carrier channel, e.g., the 9 dB down requirement, is achieved by providing isolation between adjacent channels. The isolation may be achieved by, e.g., using adjacent channels for geographically far apart cell sites and/or by interspersing ground communication channels and backhaul communication channels. The isolation may be further enhanced by the use of a high-gain, narrow-beam dish antennas that may have a narrow beam dispersion, e.g., 6–7 degrees, for a better directional transmission of signals between a BTS and a translating repeater, thereby minimizing interference between co-channels and adjacent channels.

Figure 2:
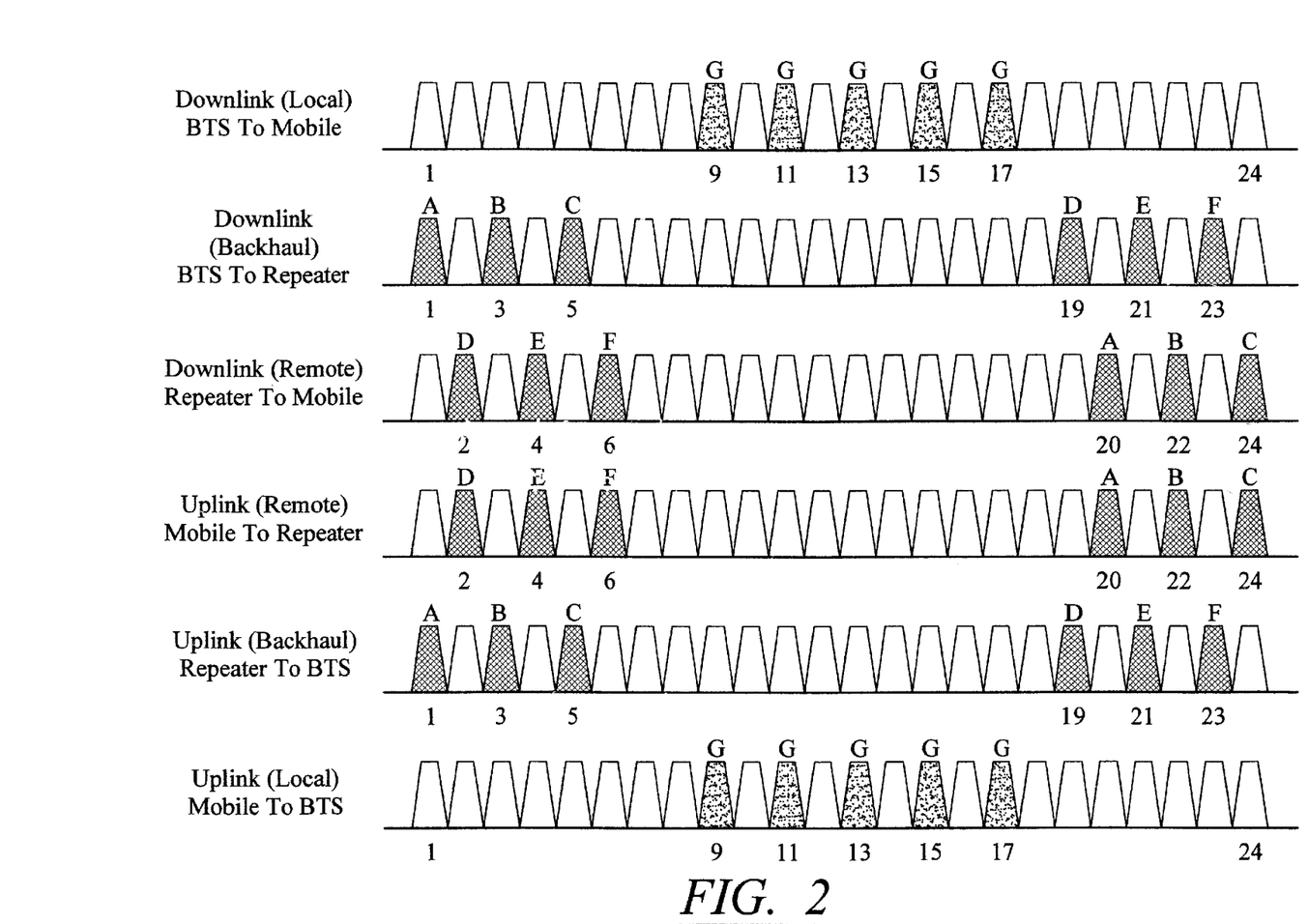
FIG. 2 illustrates an exemplary frequency assignment with respect to an N=7 frequency re-use plan according to the principles of the present invention.
Figure 3:
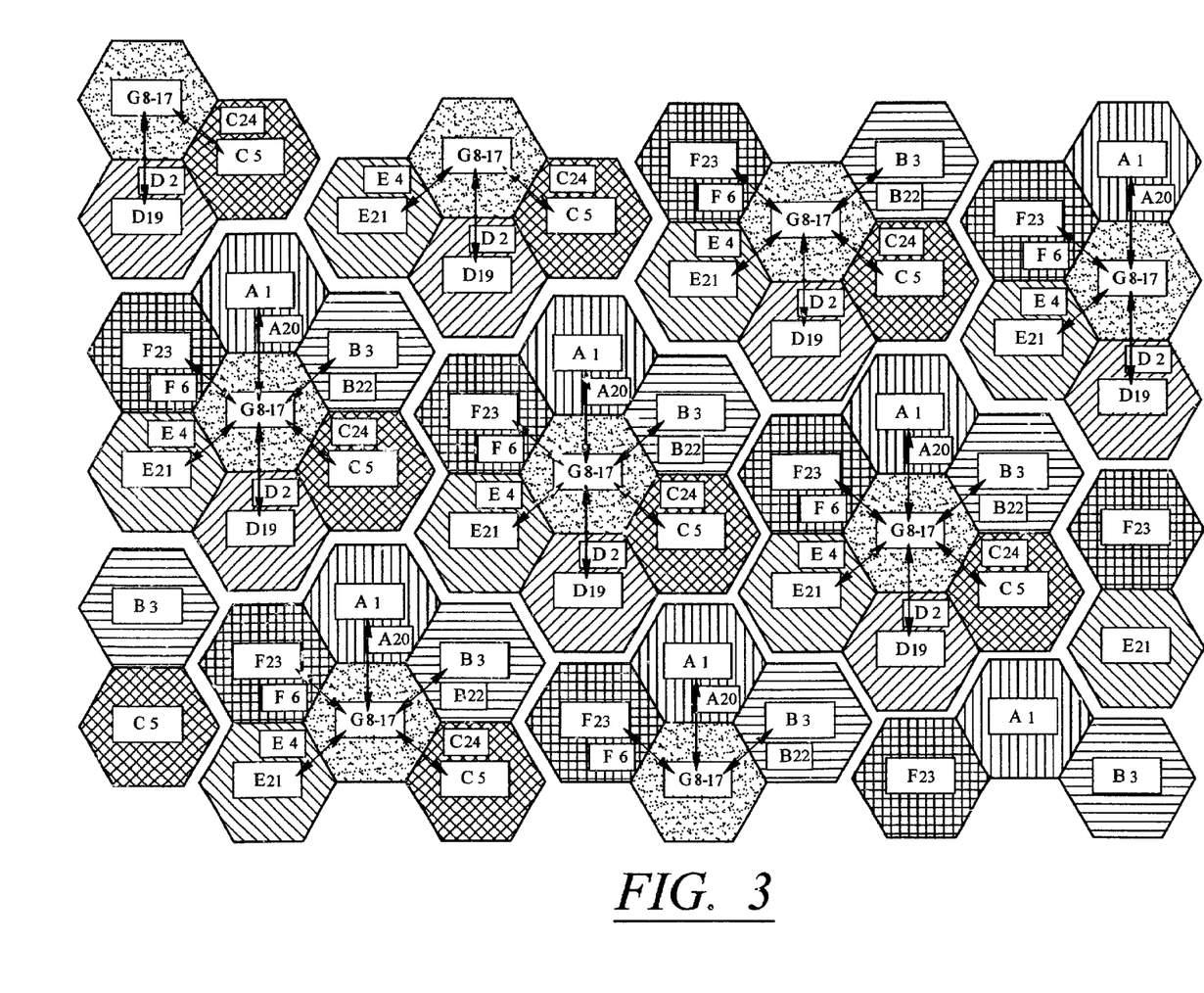
FIG. 3 illustrates an exemplary physical cell layout associated with the exemplary frequency assignment of an N=7 embodiment shown in FIG. 2.

FIGS. 2 and 3 illustrate the first exemplary embodiment in which a single BTS 15 may service up to seven (7) cells (i.e., N=7).

In particular, shown in FIG. 2 are five (5) local ground communication channels G9, G11, G13, G15, and G17 for facilitating communications between the BTS 15 and the mobile stations 19-3 or any other mobile station located within the local cell where the BTS 15 is located. FIG. 2 also shows six (6) channels A1, B3, C5, D19, E21, and F23 being available to be used as backhaul frequencies for communications between the BTS 15 and the repeaters 12. Additional six (6) channels D2, E4, F6, A20, B22, and C24 are available to be used as remote ground frequencies for communications between the repeaters 12 and the remotely located mobile stations 19-1 and 19-2.

The backhaul channels and remote ground channels are interspersed by, e.g., assigning backhaul signals to odd channels and remote ground signals to even numbered channels. It should, however, be understood that although in this exemplary embodiment odd numbered channels are used for backhaul, even channels for remote ground signals, any other interspersed arrangement of backhaul and remote ground channels, e.g., even channels for backhaul and odds for remote ground signals, may be made, and still implement the inventive frequency planning.

The required isolation between adjacent channels is achieved by assigning one of adjacent channels, e.g., channels A1 and D2, as a backhaul frequency, e.g., A1, for a first repeater, and the other one of the adjacent channels, e.g., D2, as ground channel for another repeater located away from the first repeater as can be seen in FIG. 3.

FIG. 3 shows an exemplary physical cell layout associated with the exemplary frequency assignment of an N=7 embodiment shown in FIG. 2.

In particular, it can be seen in FIG. 3 that a cluster of seven (7) cells comprise a coverage area, which the BTS 15 services. The BTS 15 is shown in the center of a cluster and having available therein G9, G11, G13, G15, and G17 for local ground communication with mobile stations 19 located within the center cell. It can also be seen that a repeater using A1 as the backhaul frequency is located away from a repeater using D2 as the ground signal frequency in order to minimize the channel interference between the two adjacent channels A1 and D2. Similarly, the cell using channels B3 and B22 is located away from the cell to which channels E4 and E21 are assigned. The cell using channels C5 and C24 is located away from the cell to which channels F6 and F23 are assigned.

As can be appreciated, the highly efficient frequency planning as shown in FIGS. 2 and 3 allows a total of 11 carrier channels for communications to and from the mobile stations 19, makes use of seventeen (17) of the twenty five (25) available channels, and allows the BTS 15 to service up to seven (7) cells (e.g., a remote cell for each of the six (6) remote ground communication channel and the local cell in which a total of five (5) local ground communication channels are available), and thus provides an improved efficiency in bandwidth utilization over the conventional planning shown in FIG. 9.

Figure 4:
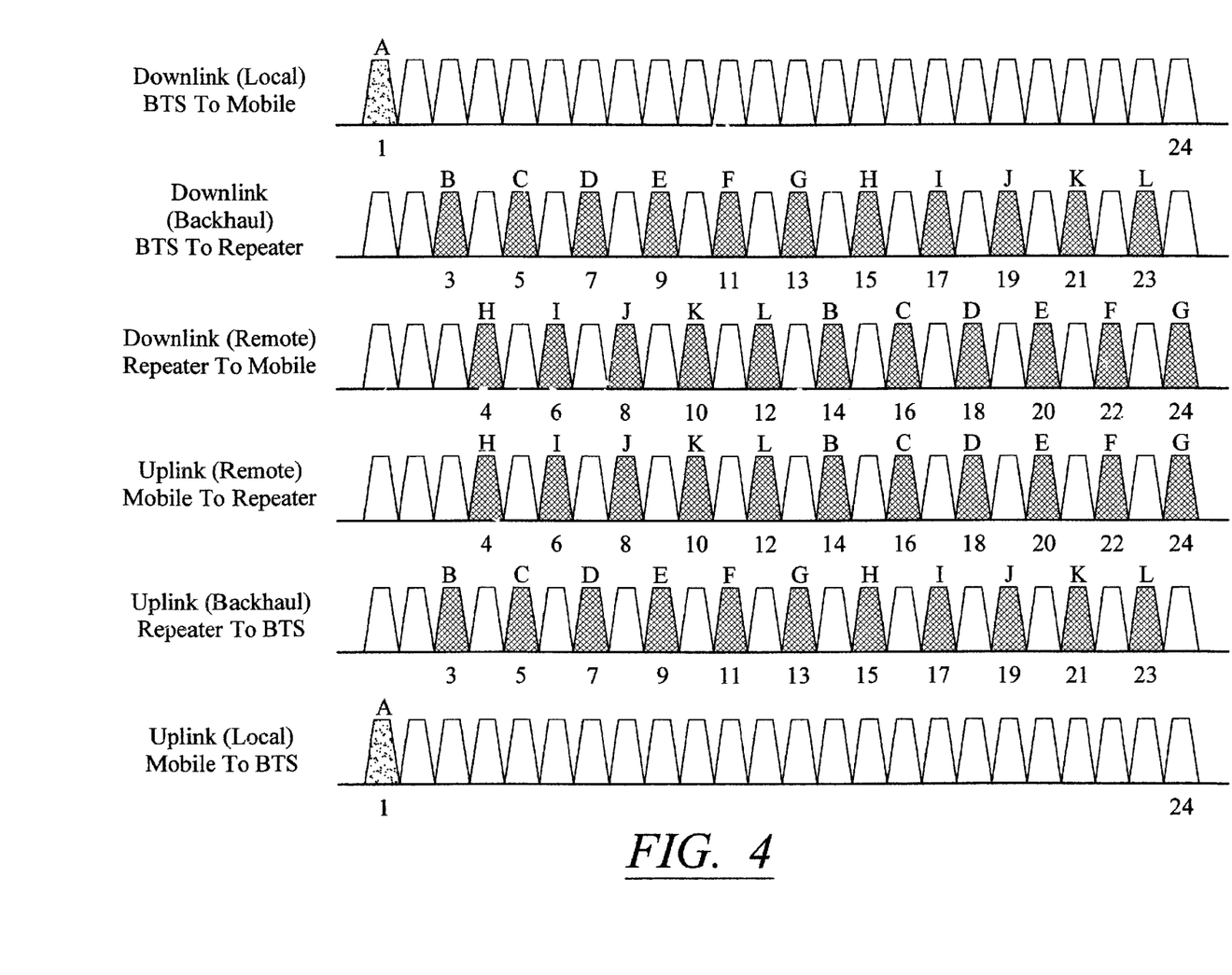
FIG. 4 illustrates an exemplary frequency assignment with respect to an N=12 frequency re-use plan according to the principles of the present invention.
Figure 5:
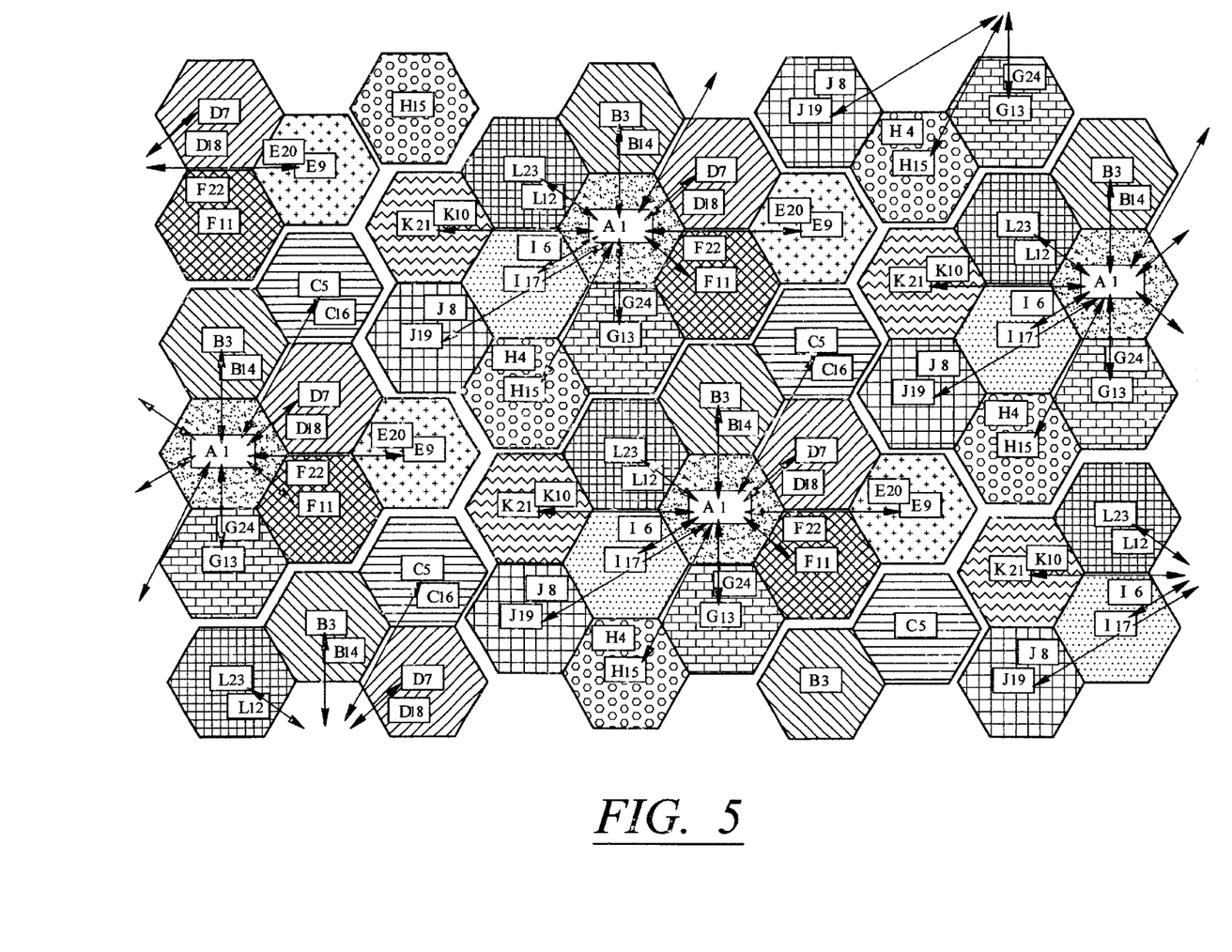
FIG. 5 illustrates a physical cell layout associated with the exemplary frequency assignment of an N=12 embodiment shown in FIG. 4.

Another exemplary embodiment in which the BTS 15 services a total of twelve (12) (N=12) cells is now described with references to FIGS. 4 and 5.

In particular, shown in FIG. 4 are one (1) local ground communication channel A1 for facilitating communications between the BTS 15 and the mobile stations 19-3 or any other mobile station located within the local cell where the BTS 15 is located. FIG. 4 also shows eleven (11) channels B3, C5, D7, E9, F11, G13, H15, I17, J19, K21, and L23 being available to be used as backhaul frequencies for communications between the BTS 15 and the repeaters 12. Additional eleven (11) channels H4, I6, J8, K10, L12, B14, C16, D18, E20, F22, and G24 are available to be used as remote ground frequencies for communications between the repeaters 12 and the remotely located mobile stations 19-1 and 19-2.

The backhaul channels and remote ground channels are interspersed by, e.g., assigning backhaul signals to odd channels and remote ground signals to even numbered channels. It should, however, be understood that although in this exemplary embodiment odd numbered channels are used for backhaul, even channels for remote ground signals, any other interspersed arrangement of backhaul and remote ground channels, e.g., even channels for backhaul and odds for remote ground signals, may be made, and still implement the inventive frequency planning.

The required isolation between adjacent channels is achieved by assigning one of adjacent channels, e.g., channels B3 and H4, as a backhaul frequency, e.g., B3, for a first repeater, and the other one of the adjacent channels, e.g., H4, as ground channel for another repeater located away from the first repeater as can be seen in FIG. 5.

FIG. 5 shows an exemplary physical cell layout associated with the exemplary frequency assignment of an N=12 embodiment shown in FIG. 4.

In particular, it can be seen in FIG. 5 that a cluster of eleven (11) cells comprise a coverage area which a BTS 15 services. The BTS 15 is shown in the center of a cluster and having available therein one (1) channel A1 for local ground communication with mobile stations 19 located within the center cell. It can also be seen that a repeater using B3 as the backhaul frequency is located away from a repeater using H4 as the ground signal frequency in order to minimize the channel interference between the two adjacent channels B3 and H4. Similarly, the cell using channels C5 and C16 is located away from the cell to which channels I6 and I17 are assigned. The cell using channels D7 and D18 is located away from the cell to which channels J8 and J19 are assigned. The cell using channels E9 and E20 is located away from the cell to which channels K10 and K21 are assigned. The cell using channels F11 and F22 is located away from the cell to which channels L12 and L23 are assigned.

As can be appreciated, the highly efficient frequency planning as shown in FIGS. 4 and 5 allows a total of 12 carrier channels for communications to and from the mobile stations 19, makes use of twenty three (23) of the twenty five (25) available channels, and allows the BTS 15 to service up to twelve (12) cells (e.g., a remote cell for each of the eleven (11) remote ground communication channels H4, I6, J8, K10, L12, B14, C16, D18, E20, F22, and G24 and the local cell in which one (1) local ground communication channel A1 is available), and thus provides an improved efficiency in bandwidth utilization over the conventional planning shown in FIG. 9.

Although the above examples given thus far provide examples of frequency re-use between a single base transceiver system (BTS) and the cells it services, the inventive frequency re-use plan according to the principles of the present invention may be used for clusters of cells having more than one base transceiver systems (BTSs).

The inventive frequency re-use plan may be implemented on any number of clusters of cells, each cluster being serviced by a respective one of any number of BTSs. In a multiple BTS frequency re-use plan, the communication channels between BTSs and repeaters are separated in the frequency spectrum from the communication channels between mobile station and repeaters, and each adjacent channel pair is assigned to cells that are geographically remote from each other.

Figure 6:
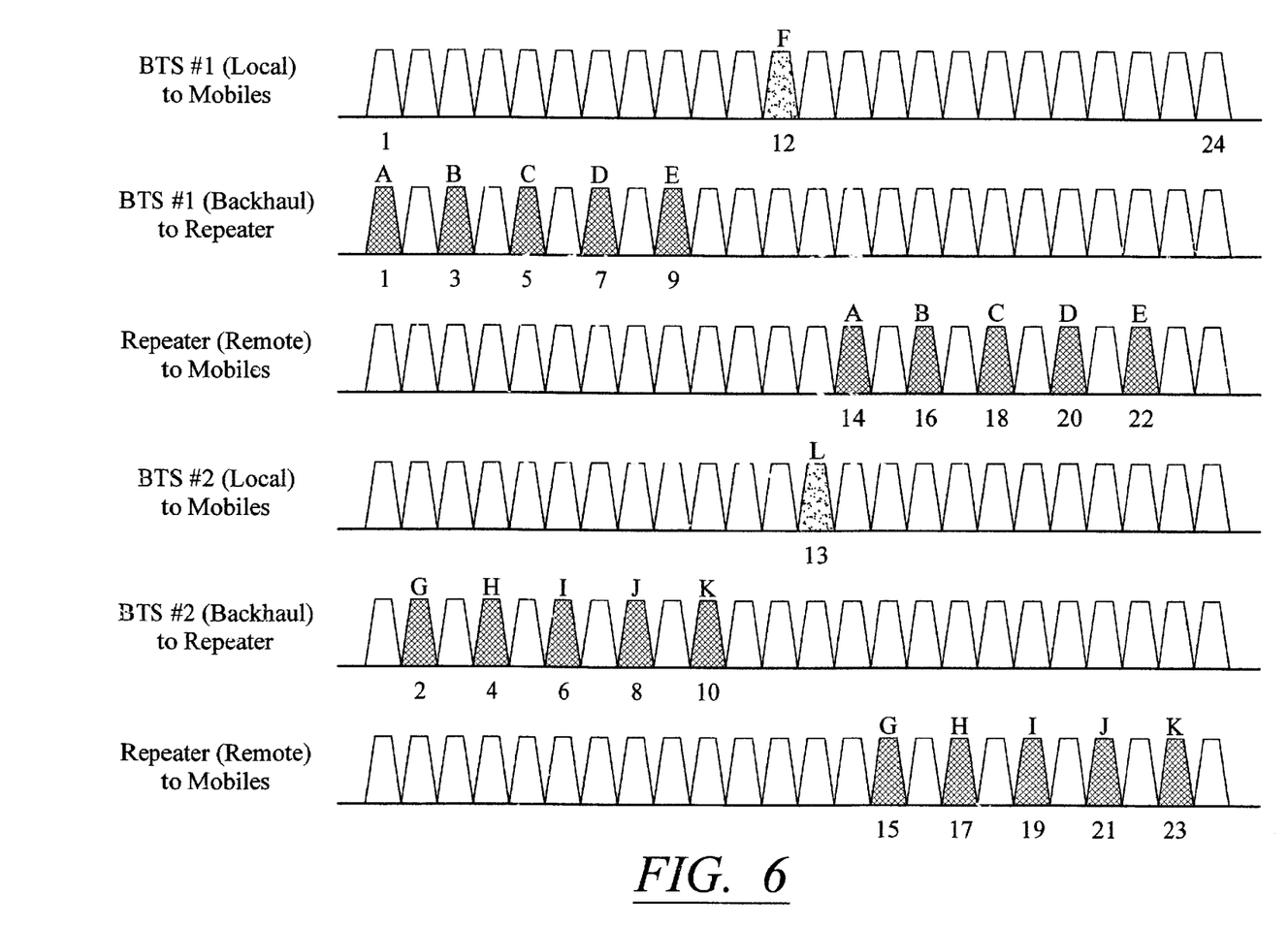
FIG. 6 illustrates an exemplary frequency assignment for frequency re-use plan with an embodiment having two base transceiver systems and each servicing six cells according to the principles of the present invention.

One example of such multiple BTS frequency re-use plan is now described with references to FIGS. 6 and 7.

FIG. 7 shows cluster #1 and cluster #2, each having five remote cells A-E and G-K, respectively. Each remote cells has a translating repeater 12. The cluster #1 and the cluster #2 each has one BTS, e.g., BTS #1 and BTS #2, respectively.

Although for an easier understanding and for simplicity in the description, two BTSs are shown in this particular example, it should be apparent to one having an ordinary skill in the art that the inventive frequency re-use plan may be implemented in an arrangement of cells having any number of BTSs.

FIG. 6 shows two (2) local ground communication channels F12 and L13 for facilitating communications between the BTS #1 15-1 and any mobile station 19-3 located within the local cell where the BTS #1 15-1 is located, and between the BTS #2 15-n and any mobile station 19-n located within the local cell where the BTS #2 15-n is located, respectively. FIG. 6 also shows five (5) channels A1, B3, C5, D7, and E9 being available to be used as backhaul frequencies for communications between the BTS #1 15-1 and the repeaters 12-1, and five (5) channels A14, B16, C18, D20, and E22 being available to be used as remote ground frequencies for communications between the repeaters 12-1 and the remotely located mobile stations 19-1 and 19-2. Also shown in FIG. 6 are five (5) channels G2, H4, I6, J8, and K10 being available to be used as backhaul frequencies for communications between the BTS #2 15-n and the repeaters 12-n, and five (5) channels G15, H17, I19, J21 and K23 being available to be used as remote ground frequencies for communications between the repeaters 12-n and the remotely located mobile stations 19-4 and 19-5.

It can be seen that the backhaul channels between BTS #1 15-1 and the repeaters 12-1 are interspersed with the backhaul channels between BTS #2 15-n and the repeaters 12-n.

It can be seen from FIG. 7 that repeaters (cells) G, H, I, J, and K that belong to the cluster #2 of cells serviced by the BTS #1 15-1 are located at a geographical location remote from the repeaters (cells) A, B, C, D, and E, which are part of the cluster #1 of cells serviced by the BTS #2 15-n. Thus, the 9 dB down requirement previously described may be met.

Moreover, for each of cluster #1 and the cluster #2, the backhaul channels are assigned to the frequencies in the opposite end of the frequency spectrum from the remote ground channels to further minimize the possible interference between the backhaul signals and the remote ground signals within each of the cells.

FIG. 7 shows an exemplary physical cell layout associated with the exemplary frequency assignment shown in FIG. 6.

In particular, it can be seen in FIG. 7 that a cluster of six (6) cells comprise a coverage area which each of the BTS #1 15-1 and BTS #2 15-n service. The BTS #1 15-1 and BTS #2 15-n are each shown in the center of its respective cluster of cells and each having available therein one (1) channel, F12, and L13, respectively, for local ground communication with mobile stations 19 located within the each respective center cell.

It can also be seen that, for the cluster #1, a repeater (cell) using A1 as the backhaul frequency uses A14 as its local ground signal frequency. A repeater (cell) using B3 as the backhaul frequency uses B16 as its local ground signal frequency. A repeater (cell) using C5 as the backhaul frequency uses C18 as its local ground signal frequency. A repeater (cell) using D7 as the backhaul frequency uses D20 as its local ground signal frequency. A repeater (cell) using E9 as the backhaul frequency uses E22 as its local ground signal frequency.

Similarly, for cluster #2, it can be seen that a repeater (cell) using G2 as the backhaul frequency uses G15 as its local ground signal frequency. A repeater (cell) using H4 as the backhaul frequency uses H17 as its local ground signal frequency. A repeater (cell) using I6 as the backhaul frequency uses I19 as its local ground signal frequency. A repeater (cell) using J8 as the backhaul frequency uses J21 as its local ground signal frequency. A repeater (cell) using K10 as the backhaul frequency uses K23 as its local ground signal frequency.

Furthermore, in order to minimize the channel interference between the two adjacent channels, the cell using A1 as the backhaul frequency is located away from a cell using G2 as the ground signal frequency. Similarly, the cell using channels B3 and B16 is located away from the cell to which channels H4 and H17 are assigned. The cell using channels C5 and C18 is located away from the cell to which channels I6 and I19 are assigned. The cell using channels D7 and D20 is located away from the cell to which channels J8 and J21 are assigned. The cell using channels E9 and E22 is located away from the cell to which channels K10 and K23 are assigned.

As can be appreciated, the highly efficient frequency planning as shown in FIGS. 6 and 7 allows a total of 12 carrier channels for communications to and from the mobile stations 19, makes use of twenty two (22) of the twenty five (25) available channels, and allows the BTS #1 15-1 and the BTS #2 15-n to each service up to six (6) cells (e.g., a remote cell for each of the five (5) remote ground communication channels and one (1) local ground communication channel), for a total of twelve (12) cells, and thus provides an improved efficiency in bandwidth utilization over the conventional planning shown in FIG. 9.

While the invention has been described with reference to the exemplary embodiments thereof, those skilled in the art will be able to make various modifications to the described embodiments of the invention without departing from the true spirit and scope of the invention.

What is claimed is:

1. A method of assigning a plurality of communication channels of an available radio frequency bandwidth in a wireless communications network, comprising:

providing a plurality of base transceiver systems, each of said plurality of base transceiver systems being operable to communicate with a cluster of cells among a plurality of clusters of cells, each cluster of said plurality of clusters of cells having a plurality of repeaters, each cell of said plurality of clusters of cells having therein an associative one of said plurality of repeaters;

assigning a first one of a pair of adjacent communication channels from said plurality of communication channels for communication between a first one of said plurality of base transceiver systems and a fist one of said plurality of repeaters, said fist one of said plurality of repeaters being associated with a fist cell from said cluster of cells in communication with said first one of said plurality of base transceiver systems; and assigning at least a second one of said pair of adjacent communication channels for communication between a second one of said plurality of base transceiver systems and a second one of said plurality of repeaters, said second one of said plurality of repeaters being associated with a second cell from said cluster of cells in communication with said second one of said plurality of base transceiver systems.

2. The method of assigning a plurality of communication channels in accordance with claim 1, further comprising:

assigning a third one of said plurality of communication channels for communication between said first one of said plurality of base transceiver systems and said first cell; and assigning a fourth one of said plurality of communication channels for communication between said first one of said plurality of repeaters and a mobile station located within said first cell, wherein said third one of said plurality of communication channels and said fourth one of said plurality of communication channels are apart from each other in a frequency spectrum.

3. The method of assigning a plurality of communication channels in accordance with claim 1, further comprising:

locating said first cell in a geographically remote location from said second cell.

4. A wireless communications network having an available radio frequency bandwidth divided into a plurality of radio frequency communication channels, comprising:

at least one base transceiver system in communication with at least one subscriber in a coverage area arranged in a plurality of geographic cells; and at least one repeater having at least one ground wireless communication channel and at least one backhaul wireless communication channel, said at least one ground communication channel being operative to provide communication between said at least one repeater and said at least one subscriber, said at least one backhaul communication channel enabling communication between said at least one base transceiver system and said at least one repeater, wherein at least two of said plurality of radio frequency communication channels adjacent to each other in a frequency spectrum are utilized by said wireless communications network for communications between at least two of said at least one base transceiver system, said at least one repeater, and said at least one subscriber.

5. The wireless communications network according to claim 4, wherein:

said at least one base transceiver system comprises:

a first base transceiver system; and a second base transceiver system, wherein one of two adjacent ones of said plurality of radio frequency communication channels is assigned to a first one of said plurality of geographic cells, and the other one of said two adjacent ones of said plurality of radio frequency communication channels is assigned to a second one of said plurality of geographic cells, and wherein said first one of said plurality of geographic cells is serviced by said first base transceiver system, and said second one of said plurality of geographic cells is serviced by said second base transceiver system.

6. The wireless communications network according to claim 4, wherein:

said at least one base transceiver system comprises:

a plurality of base transceiver systems, wherein one of two adjacent ones of said plurality of radio frequency communication channels is assigned to a first one of said plurality of geographic cells, and the other one of said two adjacent ones of said plurality of radio frequency communication channels is assigned to a second one of said plurality of geographic cells, and wherein said first one of said plurality of geographic cells is serviced by a first one of said plurality of base transceiver systems, and said second one of said plurality of geographic cells is serviced by a second one of said plurality of base transceiver systems.

7. The wireless communications network according to claim 4, wherein:

one of two adjacent ones of said plurality of radio frequency communication channels is assigned to a first one of said plurality of geographic cells, and the other one of said two adjacent ones of said plurality of radio frequency communication channels is assigned to a second one of said plurality of geographic cells, and wherein, said first one of said plurality of geographic cells is located away from said second one of said plurality of geographic cells.

8. The wireless communications network according to claim 4, wherein:

said at least one ground communication channel and said at least one backhaul communication channel are interspersedly located in said frequency spectrum.

9. The wireless communications network according to claim 8, wherein:

an even numbered channel is assigned as said at least one ground communication channel, an odd numbered channel and is assigned as said at least one backhaul communication channel.

10. The wireless communications network according to claim 4, wherein:

said plurality of geographic cells comprises twelve cells.

11. The wireless communications network according to claim 4, wherein:

said plurality of geographic cells comprises seven cells.

12. The wireless communications network according to claim 4, wherein:

said available radio frequency bandwidth is 5 MHz.

13. A method of assigning a plurality of communication channels of an available radio frequency bandwidth in a wireless communications network, comprising:

assigning at least a first one of said plurality of communication channels for communication between a repeater and a subscriber of said wireless communications network; and assigning at least a second one of said plurality of communication channels for communication between said repeater and a base transceiver system, wherein said at least first one of said plurality of communication channels is adjacent in a frequency spectrum to said second one of said plurality of communication channels.

14. The method of assigning a plurality of communication channels in accordance with claim 13, further comprising:

providing one or more repeaters each having at least one ground wireless communication channel and at least one backhaul wireless communication channel, said at least one ground communication channel being operative to provide communication between said one or more repeaters and at least one subscriber, said at least one backhaul communication channel enabling communication between said base transceiver system and said one or more repeaters, wherein each of said one or more repeaters is located within a geographic cell among a plurality of geographic cells.

15. The method of assigning a plurality of communication channels in accordance with claim 14, further comprising:

assigning one of two adjacent ones of said plurality of communication channels to a first one of said plurality of geographic cells; and assigning the other one of said two adjacent ones of said plurality of communication channels to a second one of said plurality of geographic cells, wherein said first one of said plurality of geographic cells is located away from said second one of said plurality of geographic cells.

16. The method of assigning a plurality of communication channels in accordance with claim 14, wherein:

said plurality of geographic cells comprises twelve cells.

17. The method of assigning a plurality of communication channels in accordance with claim 14, wherein:

said plurality of geographic cells comprises seven cells.

18. The method of assigning a plurality of communication channels in accordance with claim 13, further comprising:

interspersedly locating said at least one ground communication channel and said at least one backhaul communication channel in said frequency spectrum.

19. The method of assigning a plurality of communication channels in accordance with claim 18, wherein:

said interspersedly locating step comprises:

assigning an even numbered channel as said at least one ground communication channel; and assigning an odd numbered channel as said at least one backhaul communication channel.

* * * * *

UNITED STATES PATENT AND TRADEMARK OFFICE
CERTIFICATE OF CORRECTION

PATENT NO.   : 6,370,384 B1
DATED        : April 9, 2002
INVENTOR(S)  : Komara

It is certified that error appears in the above-identified patent and that said Letters Patent is hereby corrected as shown below:

Column 1,
Line 36, replace "BTS 805a" with -- BTS, 805a --.

Column 5,
Line 14, replace "Europeon" with -- European --.

Column 9,
Line 20, replace "#115-1" with -- #1 15-1 --.
Line 42, replace "BTS #1 15-1" with -- BTS #2 15-n --.
Line 45, replace "BTS #2 15-n" with -- BTS #1 15-1 --.

Column 10,
Line 26, replace "16 and 119" with -- I6 and I19 --.
Line 61, replace "fist" with -- first --.
Line 62, replace "fist" with -- first --.
Line 63, replace "fist" with -- first --.

Signed and Sealed this

Fifteenth Day of October, 2002

*Attest:*

*Attesting Officer*

JAMES E. ROGAN
*Director of the United States Patent and Trademark Office*